United States Patent [19]

Kishida et al.

[11] Patent Number: 4,508,875

[45] Date of Patent: Apr. 2, 1985

[54] MULTI-LAYER STRUCTURE POLYMER COMPOSITION

[75] Inventors: Kazuo Kishida, Ohtake; Akira Hasegawa, Hiroshima; Masahiro Sugimori, Ohtake, all of Japan

[73] Assignee: Mitsubishi Rayon Co., Ltd., Tokyo, Japan

[21] Appl. No.: 526,546

[22] Filed: Aug. 26, 1983

Related U.S. Application Data

[63] Continuation-in-part of Ser. No. 349,910, Feb. 18, 1982, abandoned.

[30] Foreign Application Priority Data

Feb. 25, 1981 [JP] Japan ................................. 56-26553
Mar. 9, 1981 [JP] Japan ................................. 56-33653

[51] Int. Cl.$^3$ ........................................... C08F 265/06
[52] U.S. Cl. ................................. 525/308; 525/309; 525/310; 525/902; 525/80; 525/72
[58] Field of Search ................ 525/308, 309, 310, 902

[56] References Cited

U.S. PATENT DOCUMENTS 3,787,522  1/1974  Dickie ................................. 260/836

*Primary Examiner*—Paul R. Michl
*Attorney, Agent, or Firm*—Oblon, Fisher, Spivak, McClelland & Maier

[57] ABSTRACT

A multi-layer structure polymer composition having a gel content of at least 50% which is constituted of an innermost layer polymer (A) consisting mainly of alkyl acrylate and having a degree of swelling of 10 or lower, and having a glass transition temperature lower than 10° C., a crosslinked elastomer polymer (B) consisting mainly of alkyl acrylate and having a degree of swelling slightly higher than that of said polymer (A) and having a glass transition temperature not higher than 0° C., said innermost layer polymer (A) and said crosslinked elastomer polymer (B) constituting a double layer elastomer structure polymer, as well as an outermost layer polymer (C) consisting mainly of alkyl methacrylate and having a glass transition temperature not lower than 60° C., and at least one intermediate layer (D) existing between said polymer (B) layer and said polymer (C) layer, the amount of alkyl acrylate in said intermediate layer (D) linearly decreasing from said polymer (B) layer to said polymer (C) layer. Said polymer composition does not readily show the phenomenon of whitening even if dipped in hot water or boiling water and is excellent in weather resistance, solvent resistance, stress-whitening resistance, water-whitening resistance and transparency.

20 Claims, No Drawings

MULTI-LAYER STRUCTURE POLYMER COMPOSITION

This application is a continuation-in-part application of Ser. No. 349,910, filed Feb. 18, 1982, now abandoned.

BACKGROUND OF THE INVENTION

1. Field of the Invention

This invention relates to a multi-layer structure polymer composition quite excellent in weather resistance, solvent resistance, stress-whitening resistance, water-whitening resistance and transparency. More particularly, this invention relates to an acrylic multi-layer structure polymer composition not only quite excellent in weather resistance, solvent resistance, stress-whitening resistance and transparency but also in water-whitening resistance which does not readily show the whitening phenomena even if dipped in hot or boiling water. Said composition is a multi-layer structure polymer constituted from an innermost polymer layer (A) consisting mainly of alkyl acrylate and having rather higher crosslink density, a crosslinked elastic polymer (B) consisting mainly of alkyl acrylate and having lower crosslink density than that of innermost polymer layer (A) said innermost polymer layer (A) and said crosslinked elastic polymer (B) constructing a double layer elastomer structure, an outermost polymer (C) consisting mainly of alkyl methacrylate and having a glass transition temperature of 60° C. or higher, and at least one intermediate layer (D) which exists between said polymer (B) layer and said polymer (C) layer and of which alkyl acrylate content linearly decreases from said polymer (B) layer to said polymer (C) layer, and said multi-layer structure polymer has a gel content of at least 50%.

2. Description of the Prior Art

Having a beautiful appearance and a prominent weather resistance, acrylic resins and particularly methyl methacrylate polymer occupy a unique position among the general purpose resins and are in use as a molding material for wide variety of products such as injection-molded products, extrusion-molded products and so on.

On the other hand, since these polymers are hard and brittle, it has been desired to given them an elasticity when they are put to special uses, and various studies have hitherto been conducted for this purpose. As a method for giving them elasticity, a method of blending them with an elastomer, a method of simply copolymerizing them with an elastomeric component a method of graft-polymerizing an elastomer with the component of these resins to give a multi-stage polymer, and various other methods have been employed.

Among the products of these techniques, multi-layer polymers containing acrylic rubber are currently used as molding material for film and sheet having a high weather resistance as characteristic feature. In the existing state of things, however, they lack stress-whitening resistance and water-whitening resistance so that sufficiently satisfactory characteristic properties cannot yet be obtained therefrom. That is, these whitening resistances are very important factors in using them alone as a film or a sheet or as a laminate with other base material, because the whitening at the time of bending, if it occurs, brings about a marked decrease in their commercial value. Multi-layer polymers containing acrylic rubber are proposed in, for example, Japanese Patent Application Kokai (Laid-Open) No. 33,991/77, Japanese Patent Publication No. 3,591/71 and Japanese Patent Publication No. 46,158/74. However, these polymers are products produced by simply multi-layer polymerizing a resin on a crosslinked elastomer, with which it is yet impossible to solve the problem of whitening.

Previously, the present applicant proposed a multi-layer polymer having a tapered structure as a method for solving the above-mentioned problem (Japanese Patent Application Kokai (Laid-Open) Nos. 129,449/76 and 56,150/77). Owing to their unique tapered structure and the effect of grafting, they are impact resistant polymers quite excellent in stress-whitening resistance and in transparency.

These multi-layer polymers having a tapered structure are, indeed, excellent in transparency and stress-whitening resistance. However, they have a fault that they are inferior in the impact resistance at low temperature because they have a resin layer having a high $T_g$ as their core, and the practical problem in the films formed from multi-layer polymers having a tapered structure has consisted in the improvement of their impact resistance at low temperatures, particularly in the temperature range from about 10° C. to about $-10°$ C.

Now, as the new functions obtainable by forming the above-mentioned various acrylic polymers into a film and laminating it with other base material, weather resistance, pollution resistance, decorative property and the like can be referred to. For example, lamination of acrylic film having various printed images is also one of the important uses for exhibiting a decorative effect unobtainable from other base materials themselves.

However, since general acrylic films are readily soluble in or swellable with printing ink solvents such as toluene, methyl ethyl ketone and the like, no clear print can be made on them. That is, they lack solvent resistance.

Regarding this solvent resistance, the films obtained by forming the above-mentioned multi-layer polymers having a tapered structure are similarly unsatisfactory, and their improvement in solvent resistance has been desired. Nevertheless, because of the restriction in their polymer structure, it has been difficult to improve their solvent resistance sufficiently without sacrificing their other properties.

Further, as an important general fault of acrylic films, the readiness with which they undergo whitening when dipped in hot water or boiling water can be referred to. Such phenomena pose a practically important problem particularly in the field of lamination on steel board and fields in which the film is apt to be in contact with hot or boiling water.

No effective method for solving such a problem of whitening phenomena has yet been discovered.

SUMMARY OF THE INVENTION

In view of above, the present inventors studied the polymer structure in detail. Particularly, they conducted an elaborated study with the aim of obtaining a multi-layer structure polymer composition having excellent characteristics in solvent resistance and whitening resistance and excellent in transparency, weather resistance and impact resistance. As a result, it was found that a multi-layer structure polymer composition suitable for the production of a film or a sheet satisfying the above-mentioned conditions can be obtained by polymerizing a crosslinked elastic polymer (B) consisting mainly of alkyl acrylate and having rather lower crosslink density in the presence of an innermost layer polymer (A) consisting mainly of a specified alkyl acrylate and having higher crosslink density than that of the crosslinked elastic polymer (B), providing, as the outermost layer, an outermost layer polymer (C) consisting mainly of alkyl methacrylate and having a glass transition temperature of 60° C. or higher, placing an intermediate layer (D) between said polymer (B) layer and said polymer (C) layer so that the amount of alkyl acrylate in layer (D) linearly decreases from said polymer (B) layer to said polymer (C) layer and regulating the gel content of the final polymer to a specified quantity by using a graft linking agent in each of the polymer layers other than the outermost layer (C) in amounts falling in specified ranges. Based on this finding, this invention was accomplished.

Thus, this invention consists of a multi-layer structure polymer which has, as fundamental structural units:

an innermost layer polymer (A) constituted of 50 to 100 parts by weight of alkyl acrylate having $C_1$ to $C_8$ alkyl group ($A_1$), 0 to 50 parts by weight of alkyl methacrylate having $C_1$ to $C_4$ alkyl group ($A_2$), provided that the total of ($A_1$) and ($A_2$) is 80 to 100 parts by weight, 0 to 20 parts by weight of a monomer having copolymerizable double bond ($A_3$), 0 to 10 parts by weight of a polyfunctional monomer ($A_4$), provided that the total of ($A_1$), ($A_2$), ($A_3$) and ($A_4$) is 100 parts by weight, and 0.1 to 5 parts by weight, per 100 parts by weight of the total of ($A_1$) to ($A_4$), of a graft linking agent ($A_5$), an innermost layer polymer (A) is having a glass transition temperature ($T_g$) of lower than 10° C., gel content of 80% by weight or higher, and degree of swelling of 10 or lower;

a crosslinked elastic polymer (B) constituted of 80 to 100 parts by weight of alkyl acrylate having $C_1$ to $C_8$ alkyl group ($B_1$), 0 to 20 parts by weight of alkyl methacrylate having $C_1$ to $C_4$ alkyl group ($B_2$), 0 to 20 parts by weight of a monomer having a copolymerizable double bond ($B_3$), 0 to 10 parts by weight of a polyfunctional monomer ($B_4$), provided that the total of ($B_1$), ($B_2$), ($B_3$) and ($B_4$) is 100 parts by weight, and 0.1-5 parts by weight, per 100 parts by weight of the total of ($B_1$) to ($B_4$), of a graft linking agent ($B_5$); a crosslinked elastic polymer (B) ia having a $T_g$ of 0° C. or lower and degree of swelling slightly higher than that of innermost layer polymer (A); and an outermost layer polymer (C) constituted of 51 to 100 parts by weight of alkyl methacrylate having $C_1$ to $C_4$ alkyl group ($C_2$), 0 to 29 parts by weight of alkyl acrylate having $C_1$ to $C_8$ alkyl group ($C_1$) and 0 to 20 parts by weight of a monomer having a copolymerizable double bond ($C_3$), provided that the total of ($C_1$), ($C_2$) and ($C_3$) is 100 parts by weight, and having a $T_g$ of 60° C. or higher;

and has, as intermediate layer (D) existing between polymer (B) layer and polymer (C) layer:

at least one intermediate layer (D) constituted of 10 to 90 parts by weight of alkyl acrylate having $C_1$ to $C_8$ alkyl group ($D_1$), 90 to 10 parts by weight of alkyl methacrylate having $C_1$ to $C_4$ alkyl group ($D_2$), 0 to 20 parts by weight of a monomer having a copolymerizable double bond ($D_3$), 0 to 10 parts by weight of a polyfunctional monomer ($D_4$), provided that the total of ($D_1$), ($D_2$), ($D_3$) and ($D_4$) is 100 parts by weight, and 0.1 to 5 parts by weight, per 100 parts by weight of the total of ($D_1$) to ($D_4$), of a graft linking agent ($D_5$), wherein the amount of alkyl acrylate in said intermediate layer (D) linearly decreases from the crosslinked elastic polymer (B) to the outermost layer polymer (C), provided that the gel content in said multi-layer structure polymer composition is at least 50%.

DETAILED DESCRIPTION OF THE PREFERRED EMBODIMENTS

The characteristic features of this invention consist of:
(1) The crosslinked elastic polymer (B) is formed into a double layer elastomer structure containing the innermost layer polymer (A) as the inner layer,
(2) at least one intermediate layer (D) is placed between the layer of crosslinked elastic polymer (B) and the layer of outermost layer polymer (C),
(3) $T_g$ of the outermost layer polymer (C) is adjusted to 60° C. or higher,
(4) the interstices between said layers (A), (B), (D) and (C) are chemically graft-linked with a graft linking agent having an allyl group, and
(5) gel content of the final polymer is adjusted to at least 50%.

A multi-layer structure polymer composition having the above-mentioned various characteristic properties can be obtained only by fulfilling all these necessary conditions. In other words, the polymer composition constituting the object of this invention cannot be obtained if even one of these conditions is not fulfilled. Particularly, an important characteristic feature of this invention is that the crosslinked elastic polymer (B) constructs a double layer elastomer structure containing the innermost layer polymer (A) as an inner layer.

As compared with diene type rubbers, acrylic rubbers are generally superior in weather resistance but they are slower in elastic recovery, give a greater deformation under stress and exhibit less rubberiness. Therefore, there is a limit in giving the above-mentioned solvent resistance and water-whitening resistance to the hithero known elastomer structures consisting of one layer while maintaining their excellent weather resistance.

In this invention, the innermost layer polymer (A) is placed at the core of crosslinked elastic polymer (B) in order to solve the above-mentioned faults. That is, owing to the existence of the innermost layer polymer (A), the strain concentrated into the crosslinked elastic polymer (B) layer under stress is poly-dispersively relaxed and, as its result, the occurrence rate of microvoid increases, so that an excellent impact resistance can be exhibited even though stress-whitening does not apparently occur.

As above, the innermost layer polymer (A) plays a very important role to the possibility that the multi-layer structure polymer can exhibit excellencies in all the properties such as weather resistance, transparency, solvent resistance, stress-whitening resistance and the like. Accordingly, there naturally are preferable ranges with regard to the monomer composition ratio constituting the innermost layer polymer (A), as well as to characteristic properties such as $T_g$ and crosslinking density. When these values are out of the preferable ranges, no satisfactory result can be obtained.

In this invention, the alkyl acrylate having $C_1$ to $C_8$ alkyl group ($A_1$) constituting the innermost layer polymer (A) may be any of straight chain type or branched chain type; and methyl acrylate, ethyl acrylate, propyl acrylate, butyl acrylate, 2-ethylhexyl acrylate, n-octyl acrylate and the like can be used either alone or in the form of mixture, among which those having lower $T_g$ are more preferable. The alkyl methacrylate having $C_1$ to $C_4$ alkyl group ($A_2$) may be any of straight chain type and branched chain type of ones; and methyl methacrylate, ethyl methacrylate, propyl methacrylate, butyl methacrylate and the like can be used either alone or in the form of mixture.

The innermost layer polymer is constituted of these alkyl acrylate ($A_1$) and alkyl methacrylate ($A_2$), and the total amount of ($A_1$) and ($A_2$) is in the range of from 80 through 100 parts by weight. From the viewpoint of impact resistance and particularly impact resistance in the low temperature region, it is necessary that alkyl acrylate is used in a major amount. Thus, alkyl acrylate ($A_1$) is used in an amount of from 50 through 100 parts by weight, preferably from 75 through 90 parts by weight, and alkyl methacrylate ($A_2$) is used in an amount of from 0 through 50 parts by weight, preferably from 3 through 25 parts by weight. Although it is most preferable to use the same alkyl (meth)acrylate(s) throughout all the layers in a unified manner, it is also enough to satisfy the object of this invention to use a mixture of two or more kinds of monomers or to use another kind of acrylate, depending on the final object.

As said monomer having copolymerizable double bond ($A_3$), acrylic monomers such as lower alkoxy acrylates, cyanoethyl acrylate, acrylamide, acrylic acid, methacrylic acid and the like are preferable. They are used in an amount ranging from 0 part to 20 parts by weight. Styrene, alkyl-substituted styrenes, acrylonitrile, mehacrylonitrile and the like can also be used, unless their amount exceed 20% by weight based on the weight of component (A).

As said polyfunctional monomer ($A_4$), alkylene glycol dimethacrylates such as ethylene glycol dimethacrylate, 1,3-butylene glycol dimethacrylate, 1,4-butylene glycol dimethacrylate and propylene glycol dimethacrylate are preferable. Polyvinylbenzenes such as divinylbenzene, trivinylbenzene and the like, alkylene glycol diacrylates, and the like are also usable. These monomers effectively act to crosslink the layer itself in which they are contained, and do not act to link a layer with another layer.

The necessary crosslinking density may be attained even if no polyfunctional monomer ($A_4$) is used, so far as a sufficient quantity of grafging agent exists. However, the innermost polymer (A) is required to have a relatively high crosslinking density, and hence a product having well-balanced properties can be obtained more easily, if the crosslinking is carried out by using an appropriate quantity of polyfunctional monomer ($A_4$). The polyfunctional momomer ($A_4$) is used in an amount of from 0 through 10 parts by weight, and preferably from 1 through 7 parts by weight.

On the other hand, as said graft linking agent ($A_5$), copolymerizable allyl, methallyl and crotyl esters of $\alpha,\beta$-unsaturated carboxylic and dicarboxylic acids and preferably allyl esters of acrylic acid, methacrylic acid, maleic acid and fumaric acid can be referred to, among which allyl methacrylate exhibits a particularly excellent effect. Apart from them, triallyl cyanurate, triallyl isocyanurate and the like are also effective. In these graft linking agents, the unsaturated bond conjugated with ester group reacts much more speedily than allyl, methally or crotyl group to form a chemical bond. Although a part of the allyl, methallyl or crotyl group reacts to form crosslinkages in the layer, accordingly, a substantially considerable part of the allyl, methallyl or crotyl group remains unreacted. This unreacted allyl, methallyl or crotyl group effectively acts during the polymerization of the next layer and thereby forms graft-linkages between the adjacent two layers.

The amount of said graft linking agent ($A_5$) used is very important, and it is used in an amount of 0.1 to 5 parts by weight and preferably 0.5 to 2 parts by weight per 100 parts by weight of the total of the above-mentioned components ($A_1$) to ($A_4$). If its amount is less than 0.1 parts, the amount of effective graft linkage is small, so that the linkage between layers is insufficient. If its amount exceeds 5 parts by weight, it largely takes part in the reaction with the crosslinked elastic polymer (B) polymerized and formed in the second stage, so that the elasticity of the double layer crosslinked rubber elastomer having a double layer elastomer structure, which is one of the characteristic features of this invention, is decreased.

$T_g$ of the innermost layer polymer (A) must be lower than 10° C. If it is not lower than 10° C., the good impact resistance in low temperature region cannot be obtained. $T_g$ of the innermost layer polymer (A) is preferably 0° C. or below, and recommendably it is a little higher than the $T_g$ of the crosslinked elastic polymer (B). Furhter, the innermost layer polymer (A) preferably has a relatively high crosslinking density. It is at least necessary that crosslinking density of the innermost layer polymer (A) is higher than that of the crosslinked elastic polymer (B). If crosslinking density of innermost layer polymer (A) is lower than that of crosslinked elastic polymer (B), the stress concentrated into the crosslinked elastic polymer (B) cannot be relaxed effectively, so that no sufficient impact resistance can be obtained.

If the initial polymerizability is taken into consideration, the existence of the innermost layer polymer (A) is quite important for producing a stable multi-layer structure polymer composition. In general, the amount of catalyst charged is greatest in the innermost layer polymer (A) among the polymer layers.

The use of graft linking agent is essentially necessary for effectively synthesizing a double layer elastomer structure chemically linked with the crosslinked elastic polymer (B) in the second stage of the synthesis. If the graft linkage is absent, the double layer elastomer structure readily undergoes a layer separation at the time of melt forming to decrease its rubberiness and, in addition, the intended excellent weather resistance, solvent resistance and water-whitening resistance cannot be exhibited.

In the multi-layer structure polymer composition of this invention, the content of the innermost layer polymer (A) is 5 to 35% by weight and preferably 5 to 15% by weight. Preferably, it is lower than the content of crosslinked elastic polymer (B).

Next, the crosslinked elastic polymer (B) constituting the multi-layer structure polymer composition of this invention is an important component for giving a rubber elasticity to said multi-layer structure polymer composition. The crosslinked elastic polymer (B) consists of a reaction product of 80 to 100 parts by weight of alkyl acrylate having $C_1$ to $C_8$ alkyl group ($B_1$), 0 to 20 parts by weight of alkyl methacrylate having $C_1$ to $C_4$ alkyl group ($B_2$), 0 to 20 parts by weight of a monomer having a copolymerizable double bond ($B_3$), 0 to 10 parts by weight of polyfunctional monomer ($B_4$) and 0.1 to 5 parts by weight, per 100 parts by weight of the total of ($B_1$) to ($B_4$), of a graftlinking agent ($B_5$).

As the above-mentioned alkyl acrylate (B$_1$), alkyl methacrylate (B$_2$), other monomer having copolymerizable double bond (B$_3$), polyfunctional monomer (B$_4$) and grafting agent (B$_5$), the same substances as the components (A$_1$) to (A$_5$) mentioned in the paragraph of innermost layer polymer (A) are used, respectively.

For obtaining good phsical properties, T$_g$ of the crosslinked elastic polymer (B) alone should be 0° C. or below and preferably −30° C. or below.

Preferably, the crosslinked elastic polymer (B) has as high a degree of polymerization as possible, because it gives the final polymer a high impact strength.

In the multi-layer structure polymer composition of this invention, the content of the crosslinked elastic polymer (B) is preferably in the range of 10 to 45% by weight. Preferably, it is higher than the content of the above-mentioned innermost layer polymer (A).

As above, owing to the existence of the double layer crosslinked rubber elastomer having a structure of double layer elastomer in which innermost layer polymer (A) and crosslinked elastic polymer (B) are graft-linked together, it has become possible to simultaneously satisfy the various properties of which satisfication has been impossible by hitherto known single component rubbers.

As the measure for expressing the crosslinking densities of the innermost layer polymer (A), the crosslinked elastic polymer (B) and the double-layer crosslinked elastomer layer formed by graft-linking them, degree of swelling and gel content can be used. Thus, it is necessary that the innermost layer polymer (A) has a degree of swelling of 10 or less, preferably from 2 through 10, the crosslinked elastic polymer (B) has a degree of swelling of from 3 through 15, preferably from 5 through 13, and the degree of swelling of the layer (A) is smaller than that of the layer (B), as measured according to the method mentioned below. Preferable range of the degree of swelling of the double-layer crosslinked elastomer is from 3 through 13. Further, as to the gel content measured by the method mentioned below, a higher gel content is more preferable in both layer (A) and layer (B). If gel content of these layers is not higher than 60%, no satisfactory characteristic properties can be obtained. Preferable range of the gel content is 85% or more in both layer (A) and layer (B).

(Measurement of gel content and degree of swelling)

According to JIS K-6388, a prescribed quantity of double layer crosslinked rubber elastomer is taken, and dipped in methyl ethyl ketone (hereinafter, referred to as MEK) at 25° C. for 48 hours. After it has been swollen, it is taken out, the abhering MEK is wiped off and then its weight is measured. Subsequently, it is dried in a vacuum drier until the MEK has been removed and the sample reaches a constant weight, after which the weight of the absolutely dried sample is measured. Degree of swelling and gel content are calculated therefrom according to the following equations:

$$\text{Degree of swelling} = \frac{\text{Weight of sample after being swollen with MEK} - \text{Weight of absolutely dry sample}}{\text{Weight of absolutely dry sample}}$$

$$\text{Gel content (\%)} = \frac{\text{Weight of absolutely dry sample}}{\text{Weight of sample taken}} \times 100$$

Generally speaking, as high as possible a degree of polymerization of crosslinked elastic polymer (B) gives a high impact strength to the final polymer. On the other hand, this rule does not apply to the core-forming innermost layer polymer (A), but the stability in the early stage of polymerization (including the formation of particles) can be enhanced by using the catalyst in a larger amount and the performances of double layer crosslinked rubber elastomer can be made better by using a larger amount of graft-active group. Such a composite effect cannot be achieved in the hitherto known single monolayer rubber polymer systems.

In some cases, the innermost layer polymer (A) and the crosslinked elastic polymer (B) can have an equal composition. However, it is absolutely necessary to prepare a double-layer elastomer structure by a two-step polymerization of an innermost layer polymer (A) having a relatively high crosslinking density and a crosslinked elastic polymer (B) having a relatively low crosslinking density, without charging the component materials at once.

Next, the outermost layer polymer (C) constituting the multi-layer structure polymer composition of this invention participates in distributing moldability, mechanical properties and the like throughout said multi-layer structure polymer composition. The outermost layer polymer (C) consists of a reaction product of 51 to 100 parts by weight, preferably 75 to 100 parts by weight of alkyl methacrylate having C$_1$ to C$_4$ alkyl group (C$_2$), 0 to 29 parts by weight, preferably 0 to 25 parts by weight of alkyl acrylate having C$_1$ to C$_8$ alkyl group (C$_1$) and 0 to 20 parts by weight of a monomer having a copolymerizable double bond (C$_3$).

As these alkyl methacrylate (C$_2$), alkyl acrylate (C$_1$) and other monomer having copolymerizable double bond (C$_3$), the same substances as (A$_2$), (A$_1$) and (A$_3$) mentioned in the paragraph of innermost layer polymer (A) can be used, respectively.

In order to obtain excellent solvent resistance and water-whitening resistance, it is necessary that T$_g$ of the outermost layer polymer (C) alone is 60° C. or above and preferably 80° C. or above. If T$_g$ of said polymer (C) alone is lower than 60° C., the final polymer cannot have high resistances to solvent and water-whitening even if its gel content is higher than 50%.

In the multi-layer structure polymer composition of this invention, the content of the outermost layer polymer (C) is 10 to 80% by weight and preferably 40 to 60% by weight.

In the multi-layer structure polymer composition of this invention, the above-mentioned innermost layer polymer (A), crosslinked elastic polymer (B) and outermost layer polymer (C) are arranged as fundamental structural units, and in addition to them there is provided at least one intermediate layer (D) between said polymer (B) layer and said polymer (C) layer, said intermediate layer (D) being constituted of 10 to 90 parts by weight, preferably 30 to 70 parts by weight of alkyl acrylate having C$_1$ to C$_8$ alkyl group (D$_1$), 90 to 10 parts by weight, preferably 70 to 30 parts by weight of alkyl methacrylate having C$_1$ to C$_4$ alkyl group (D$_2$), 0 to 20 parts by weight of a monomer having copolymerizable double bond (D$_3$), 0 to 10 parts by weight of a polyfunctional monomer (D$_4$) and 0.1 to 5 parts by weight, per 100 parts by weight of the total of (D$_1$) to (D$_4$), of a graft linking agent (D$_5$), wherein the amount of alkyl acrylate in intermediate layer(s) (D) linearly decreases from said polymer (B) layer to said polymer (C) layer. Herein, the components (D$_1$) to (D$_5$) are the same as those (A$_1$) to (A$_5$), respectively, used in the innermost layer polymer (A). The graft linking agent (D$_5$) used in the intermediate layer (D) is essentially necessary for tightly linking the polymer layers together and for obtaining various excellent properties.

In the multi-layer structure polymer composition of this invention, the content of each intermediate layer (D) is 5-35% by weight. If its amount is less than 5% by weight, it loses the function as an intermediate layer. If its amount exceeds 35% by weight, the final polymer loses balance, which is undesirable.

The multi-layer structure polymer composition of this invention is constituted of the above-mentioned polymer layers (A), (B), (C) and (D). Additionally, it is also necessary for giving said multi-layer structure polymer composition the intended excellent solvent resistance and water-whitening resistance that its gel content is at least 50% and preferably at least 60%, which is one of the important characteristic features of this invention. The term "gel content" herein referred to comprises the content of the double layer cross-linked rubber elastomer itself and the content of graft components onto said crosslinked rubber elastomers in intermediate layer (D) and outermost layer polymer (C). Said gel content is expressed by percentage by weight of the insoluble matter obtained by preparing 1% (by weight) MEK solution of multi-layer structure polymer composition, allowing the solution to stand at 25° C. for 24 hours and then centrifuging it by means of a centrifugal machine at 16,000 r.p.m. for 90 minutes. Since the gel content is the sum of the weights of double layer crosslinked rubber elastomer and graft chain, it can be replaced with rate of grafting. In this invention, however, gel content is used as the measure of the quantity of grafiting because of the special structure.

Although a higher gel content is advantageous from the viewpont of solvent resistance, existence of free polymer having a weight not less than a critical weight is necessary from the viewpoint of easiness to mold. Therefore, the upper limit of the gel content is preferably 80%.

In producing the multi-layer structure polymer composition of this invention, the particle size of the emulsion of the final polymer is not critical. However, a particle size falling in the range of about 800-2,000 Å gives the best-balanced structure. The surfactant, catalyst and the like used in the production are not critical. Salting-out treatment is carried out optionally after adding additives such as antioxidant, lubricant or the like.

In practising this invention, care should be devoted to the very important fact that the content of residual metal in the final product must not exceed 500 ppm in the salting out treatment with metallic salt. Particularly when a metallic salt having a strong affinity to water, such as salts of magnesium, sodium or the like, is used as a salting-out agent, it is practically desirable to lower as much as possible the content of residual metal in order that whitening phenomenon does not readily appear when the final polymer is dipped in boiling water. Although a relatively good tendency is observable when coagulation is carried out with calcium compound or sulfuric acid, a residual metal content not exceeding 500 ppm is at any rate desirable for giving the product an excellent water-whitening resistance.

As the process for producing the multi-layer structure polymer composition of this invention, successive multi-stage polymerization process by the method of emulsion polymerization is most suitable. However, the process is not limited to the above, but the production can also be practised by, for example, the emulsion-suspension polymerization process according to which the emulsion polymerization system in the early stage of production is afterwards transformed to a suspension polymerization system at the time of polymerizing the outermost layer polymer (C).

The multi-layer structure polymer of the invention is suitable for use as a base material for film and sheet, and can easily be formed into a film by conventional processes such as inflation process, T-die process and the like.

In forming it, general additives such as ultraviolet absorber, antioxidant, stabilizer, lubricant, colorant, delustering agent, filler and the like can be added. Addition of an ultraviolet absorber is particularly preferable, because it further improves the excellent weather resistance which is one of the characteristic features of the invention.

The films and sheets obtained from the multi-layer structure polymer of the invention are excellent in transparency, exhibit no whitening phenomena even under stress or in boiling water, and are so excellent in weather resistance that they hardly show changes in appearance and physical properties even if used outdoors for a long period of time, so that they have a very high commercial value. Further, since they are excellent in solvent resistance, various prints are easily applicable to them. Such printed films have a beautiful ornamental effect in themselves and therefore the high commercial value is further increased.

It is also possible to make the multi-layer structure polymer composition of this invention into a resin composition by blending it with a thermoplastic resin which is at least one polymer selected from the following group (a) or group (b) or a mixture consisting of at least one polymer selected from group (a) and at least one polymer selected from group (b):

(a) homopolymers of vinyl monomers having a general formula $CH_2=CHX$, homopolymers of vinylidene monomers having a general formula $CH_2=CXY$ and copolymers consisting of two or more of these monomers, provided that X and Y in the above-mentioned general formulas represent H, Cl, F, Br, $CH_3$, COOH, $COOCH_3$, CN, $OCOCH_3$ $C_6H_5$, alkoxy, $OCCH_3$ or $SO_3H$;

(b) polycarbonates, thermoplastic polyesters and polyamides.

Since the multi-layer structure polymer composition of this invention has a special multi-layer polymer structure having the specified gel content, it can be made into a resin composition excellent in transparency and entirely free from or quite insusceptible to stress-whitening by blending it with the above-mentioned thermoplastic resin which is miscible with the multi-layer structure polymer composition of this invention even if it is different from the latter in refractive index. Said resin composition is composed of 99-1 parts by weight of the multi-layer structure polymer composition and 1-99 parts by weight of the thermoplastic resin.

Among the polymers belonging to group (a), methyl methacrylate type polymers give a resin composition of particularly high commercial value when used for the blending. When the blending is carried out with vinyl chloride resin, the multi-layer structure polymer composition acts as a sort of weather resistance and impact resistance improver and gives a resin composition excellent in transparency and markedly insusceptible to stress-whitening. Apart from them, blended compositions with other thermoplastic resins such as polystyrene, AS resin, polyethylene and the like are also much better in characteristic properties than hitherto known ones. A resin composition prepared by blending the multi-layer structure polymer composition with polyvinylidene fluoride is excellent in weather resistance, transparency, stress-whitening resistance, chemical resistance, toughness and moldability. Particularly, a resin composition consisting of 99–50 parts by weight of the multi-layer structure polymer composition and 1–50 parts by weight of polyvinylidene fluoride is excellent as an material for film formation and gives a transparent and tough film excellent in weather resistance, stress-whitening resistance and chemical resistance. Such a film has a very high commercial value because weather resistance and design effect can easily be given to usual molded articles by laminating it on the surface of the latter. When a resin composition consisting of the multi-layer structure polymer composition and polyvinylidene fluoride is used as an elementary material for film formation, the weights of the two ingredients to be compounded are preferably in the above-mentioned ranges. If the amount of polyvinylidene fluoride exceeds 50 parts by weight, the adhesive property of the film to molded articles decreases so that its use is restricted. However, no particular problems will arise even if the amount of polyvinylidene fluoride exceeds 50 parts by weight, so far as the composition is used as a usual molding material.

By modifying the refractive index of the multi-layer structure polymer composition without changing its fundamental structure in accordance with the type of the polymer to be blended therewith, a composition additionally more excellent in transparency can be obtained.

The thermoplastic resins belonging to group (b) are those selected from polycarbonates, thermoplastic polyesters and polyamides. These polymers are homopolymers or copolymers containing 60% or more of the constitutional fundamental recurring units.

A resin composition consisting of the multi-layer structure polymer composition and polycarbonate shows marked increses of impact strength, processability and weather resistance and brings about a great decrease in commercial unit cost.

On the other hand, resin compositions by compounding of polyamides such as nylon-6, nylon-6, 6 and the like are greatly improved in the manifestation of impact strength and exhibit an effect of improving the polyamides in point of their characteristic water vapor absorption.

Further, the compositions by compounding with thermoplastic polyesters have effects of improving the impact strength, overcoming the fault of drawdown and greatly improving the processability.

Optionally, antioxidant, ultraviolet absorber, filler, pigment and the like may be incorporated into the resin composition prepared by blending the multi-layer structure polymer composition of this invention with the specified thermoplastic resin.

Next, this invention will be illustrated concretely with reference to the following examples, wherein parts and percentages are by weight. The abbreviations used in the examples have the following meanings:

| Methyl methacrylate | MMA |
| Butyl acrylate | BuA |
| Butyl methacrylate | BMA |

| -continued | |
| --- | --- |
| 2-Ethylhexyl acrylate | 2EHA |
| 1,3-Butylene glycol dimethacrylate | BD |
| Allyl methacrylate | AMA |
| Acrylonitrile | AN |
| Methyl acrylate | MA |
| Triallyl cyanurate | TAC |
| Cumene hydroperoxide | CHP |
| Sodium formaldehyde sulfoxylate | SFS |
| Styrene | St |
| Polymethyl methacrylate | PMMA |
| Polystyrene | PSt |
| Polyvinyl chloride | PVC |
| Polyethylene | PE |
| Polycarbonate | PC |
| Polyethylene terephthalate | PET |
| Nylon-6 | N-6 |
| Polyvinylidene fluoride | PVDF |

$T_g$ of each polymer layer used in the examples has been calculated according to the following well-known Fox equation by using the $T_g$ values mentioned in, for example, "Polymer Handbook" published by JOHN WILEY & SONS.

$$\frac{1}{T_g} = \frac{a_1}{T_{g1}} + \frac{a_2}{T_{g2}}$$

The values of solvent resistance, water-whitening resistance, total light transmittance and tear strength shown in the examples have been determined according to the following methods:

Solvent resistance: A film formed into a thickness of 50μ was allowed to stand for 24 horus in a thermostatted room kept at 25° C. Then, a cylindrical filter paper impregnated with MEK was placed on the film for 60 seconds and then removed. The change in the appearance of the film surface was visually examined. The results are expressed with the following marks:

|   | No change is observed at all. |
| --- | --- |
|   | The surface is somewhat roughened. |
| Δ | Some wrinkles appear. |
| x | Gross deformation is observed. |

Water-whitening resistance: A film formed into a thickness of 50μ was held between 200 mesh metallic wire gauzes and dipped in boiling water for 60 minutes, after which the change in its appearance was visually examined. The results are expressed with the following marks:

|   | No change is observed in transparency. |
| --- | --- |
|   | Whitening is scarcely observed. |
| Δ | Whitening is noticeable. |
| x | Whitening occurs. |

Sheet-formability: A sheet having a thickness of 0.5 mm was formed by extrusion by the use of T-die (coat hanger type). Sheet formability was evaluated based on the shape of the sheet. (Resin temperature 250° C., rotation speed of screw (L/D=24) 40 r.p.m., take-off speed 5 m/min)

(Good) ⟵⟶X (Bad)

Total light transmittance and Haze: It was measured with integrating sphere haze meter according to ASTM D 1003–61.

Sheet plate transparency: Transparency of the above-mentioned extruded sheet was measured with integrating sphere haze meter according to ASTM D 1003-61.

|   | Haze less than 10% |
|---|---|
|   | Haze 10-20% |
| Δ | Haze 20-25% |
| x | Haze more than 25% |

Test strength: It was measured by Elmendorf method with a sample having 2 mm notch according to JIS P-8116.

Tensile strength and elongation: They were measured according to JIS Z 170-2.

Du Pont impact test: It was carried out with the condition of tip R=½ inch, 1 kg of load, 50 cm of falling height, 20° C. of temperature.

2 mm Plate Dynstat impact strength: It was measured for a plate having a thickness of 2 mm according to DIN 53452.

Izod impact strength: It was measured according to ASTM D-256.

Drawdown property was expressed with the following marks:

|   | Drawdown property is markedly improved. |
|---|---|
|   | Drawdown property is improved to some extent. |
| x | Drawdown property is little improved. |

EXAMPLE 1

In a polymerization vessel equipped with a cooler, 250 parts of deionized water, 2 parts of sodium salt of sulfosuccinic ester and 0.05 part of SFS were charged and stirred under a stream of nitrogen. Then, a mixture consisting of 1.6 parts of MMA, 8 parts of BuA, 0.4 part of BD, 0.1 part of AMA and 0.04 part of CHP was charged. After heating the resulting mixture to 70° C., it was reacted for 60 minutes to complete the polymerization of innermost layer polymer (A). Subsequently, a monomer mixture for forming the crosslinked elastic polymer (B) shown in Table 1 was added over a time period of 60 minutes and polymerized to obtain a double layer crosslinked rubber elastomer. In this case, the amount of CHP used for the formation of said polymer (B) was 0.05% based on said monomer mixture.

Degrees of swelling and gel contents of the innermost layer polymer (A) and the double-layer structure crosslinked elastomer thus obtained were measured by the above-mentioned methods. As the result, the innermost layer polymer (A) had a degree of swelling of 8.5 and a gel content of 92%; and the double-layer structure crosslinked elastomer, as a whole, had a degree of swelling of 10.0 and a gel content of 90%.

Subsequently, a mixture consisting of 5 parts of MMA, 5 parts of BuA and 0.1 part of AMA was reacted for forming an intermediate layer (D), and a monomer mixture having varied compositon as shown in Table 1 was reacted for forming an outermost layer polymer (C) different in $T_g$ from one another (Experiment Nos. 1-4). In any cases, the final particle size was in the range of 1,000-1,500 Å.

The polymer emulsions obtained above were salted out by adding 5 parts of calcium chloride per 100 parts of polymer, washed, dried, compounded with a stabilizer, formed and then subjected to various tests. The amount of residual calcium in the final polymer compositions was about 200 ppm. Their gel contents were 60% or above in all cases.

All the polymers obtained above could easily be formed into 50μ film by the usual methods.

The results of Table 1 reveal the following fact. In the solvent resistance test, the product of Experiment No. 4 of which outermost layer polymer (C) has a $T_g$ value lower than 60° C. is readily attacked by solvent so that its printing resistance is not good, even though it has a high gel content.

When each of the above-mentioned films except for the films according to Experiment No. 4 was laminated on polycarbonate sheet and subjected to an accelerated exposure of 3,000 hours by means of Sunshine weather-o-meter, no change in appearance was observed in any of the cases.

TABLE 1

| Experiment No. | Compositions of polymer layers (part) | | | | Tg of layer (C) itself (°C.) |
|---|---|---|---|---|---|
|   | Layer (A) MMA/BuA/BD/AMA | Layer (B) MMA/BuA/BD/AMA | Layer (D) MMA/BuA/AMA | Layer (C) MMA/BuA |   |
| 1 | 1.6/8/0.4/0.1 | 1.5/22.5/1.0/0.25 | 5/5/0.1 | 52.25/2.75 | 86.6 |
| 2 | " | " | " | 49.5/5.5 | 79.2 |
| 3 | " | " | " | 46.75/8.25 | 67.5 |
| 4 (Comparative Example) | " | " | " | 44/11 | 56.6 |

| Experiment No. | Gel content (%) | Solvent resistance | Water-whitening resistance | Total light transmittance (%) | Tear strength (kg/cm) | Whitening on bending |
|---|---|---|---|---|---|---|
| 1 | 67 |   |   | 89 | 2.5 |   |
| 2 | 66 |   | " | 90 | 2.8 | " |
| 3 | 64 | Δ | " | " | 3.0 | " |
| 4 (Comparative Example) | 68 | x | " | " | 2.1 | " |

Tg of layers (A), (B) and (D) themselves:
- (A) −38° C.
- (B) −49° C.
- (D) +4° C.

EXAMPLE 2

By repeating the procedure of Example 1, the multi-layer structure polymers of Experiment Nos. 5-9 were prepared by varying the compositions of innermost layer polymer (A) and crosslinked elastic polymer (B) as shown in Table 2.

Experiment No. 9 is the case of a 3-stage polymer products of the invention, it is inferior in the over-all balance of properties, and particularly shows a small elongation at break at −5° C.

TABLE 2

| | Compositions of polymer layers | | | |
|---|---|---|---|---|
| | Layer (A) MMA/BuA/BD/AMA | Layer (B) MMA/BuA/BD/AMA | Layer (D) MMA/BuA/AMA | Layer (C) MMA/BuA |
| 5 | 4/5.6/0.4/0.1 | 1.5/22.5/1.0/0.25 | 5/5/0.1 | 52.25/2.75 |
| 6 | 0.6/9/0.4/0.1 | " | " | " |
| 7 | 0.9/8.5/0.6/0.1 | 0/25/0/0.5 | " | " |
| 8 (Comparative Example) | 0/10/0/0.1 | 1.5/22.5/1.0/0.25 | " | " |
| 9 (Comparative Example) | — | 9/21/1.2/0.25 | 10/10/0 | 45/5 |
| 10 (Comparative Example) | 10/0/0/0.1 | 1.5/22.5/1.0/0.25 | 5/5/0.1 | 52.25/2.75 |

| | Degree of swelling | | Gel content (%) | | Tg (°C.) | | | |
|---|---|---|---|---|---|---|---|---|
| | Layer (A) | Total of layers (A) and (B) | Layer (A) | Total of layers (A) and (B) | Layer (A) | Layer (B) | Layer (D) | Layer (C) |
| 5 | 8.0 | 10 | 90 | 91 | −8 | −49 | 4 | 87 |
| 6 | 9.0 | 11 | 93 | 93 | −49 | −49 | " | " |
| 7 | 6.5 | 11 | 93 | 92 | −46 | −55 | " | " |
| 8 (Comparative Example) | 15 | 11 | 89 | 91 | −55 | −49 | " | " |
| 9 (Comparative Example) | — | 10 | — | 88 | — | −23 | " | 79 |
| 10 (Comparative Example) | — | 7 | — | 89 | 105 | −49 | " | 87 |

| | Gel content (%) | Solvent resistance | Water whitening resistance | Total light transmittance (%) | Tear strength (kg/cm) | Bending whitening resistance | Tensile break-down elongation (−5° C.) (%) |
|---|---|---|---|---|---|---|---|
| 5 | 60 | | | 93 | 2.8 | | 50 |
| 6 | 65 | " | " | 90 | 2.7 | " | 65 |
| 7 | 70 | " | " | 92 | 2.8 | " | 70 |
| 8 (Comparative Example) | 61 | " | " | 88 | 2.5 | Δ | — |
| 9 (Comparative Example) | 48 | Δ | x | 85 | 2.5 | " | — |
| 10 (Comparative Example) | 57 | " | | 91 | 2.3 | | 20 | synthesized according to the description of Japanese Patent Application Kokai (Laid-Open) No. 33,991/77.

All the polymers thus obtained could easily be formed into a film having a thickness of 50μ, and the films were evaluated in the same manner as in Example 1. The results of the evaluation are shown in Table 2.

As apparent from Table 2, all the examples of the invention exhibit satisfactory characteristic properties, whereas a sample in which degree of swelling of innermost layer polymer (A) is explicitly inferior to that of crosslinked elastomer (B) layer, i.e. the sample of Experiment No. 8, is inferior in impact resistance and shows no sufficient stress-whitening resistance.

The polymer obtained in Experiment No. 9 is low in gel content, not good in solvent resistance and very poor in water-whitening resistance.

The polymer obtained in Experiment No. 10 is a four-layer structure polymer of which innermost layer is a resin layer having a high $T_g$. As compared with the

EXAMPLE 3

Various polymers were prepared by employing the same composition and the same procedure as Experimental No. 1, except that the AMA used in Experiment No. 1 of Example 1 as a graft linking agent was used in varied amount as shown in Table 3 and TAC was used in the amount shown in Table 3. Results of the evaluations of these polymers are shown in Table 3.

Experiment No. 11 is a case of adding no AMA. The product is not good in transparency, and no improvement is noticeable there in the intended solvent resistance and water-whitening resistance.

Experiment Nos. 16 and 17 where graft linking agent is absent in either of layer (A), layer (B) and layer (D) similarly give no good results.

It is understandable that solvent resistance becomes good when gel content in the final polymer exceeds 50%.

TABLE 3

| Experiment No. | Kind of graft linking agent | Amount of graft linking agent (parts) per 100 parts of polymer layer | | | | Gel content (%) | Amount of residual calcium (ppm) | Solvent resistance | Water-whitening resistance | Total light transmittance (%) |
|---|---|---|---|---|---|---|---|---|---|---|
| | | Layer (A) | layer (B) | layer (D) | layer (C) | | | | | |
| 11 (Comparative Example) | AMA | 0 | 0 | 0 | 0 | 40 | 200 | x | Δ | 60 |
| 12 | " | 0.2 | 0.2 | 0.2 | " | 50 | " | Δ | | 88 |
| 13 | " | 2 | 2 | 2 | " | 68 | " | " | " | 92 |
| 14 | " | 5 | 5 | 5 | " | 85 | " | " | " | 93 |

TABLE 3-continued

| Experiment No. | Kind of graft linking agent | Amount of graft linking agent (parts) per 100 parts of polymer layer | | | | Gel content (%) | Amount of residual calcium (ppm) | Solvent resistance | Water-whitening resistance | Total light transmittance (%) |
|---|---|---|---|---|---|---|---|---|---|---|
| | | Layer (A) | layer (B) | layer (D) | layer (C) | | | | | |
| 15 | TAC | 1 | 1 | 1 | " | 65 | " | " | " | 92 |
| 16 (Comparative Example) | " | 0 | 0 | 2 | " | 32 | " | x | Δ | 72 |
| 17 (Comparative Example) | " | 1 | 1 | 0 | " | 36 | " | " | x | 79 |

EXAMPLE 4

A polymer was prepared by repeating the procedure of Experiment No. 1 of Example 1, except that the kind of salting out agent was varied. By using calcium chloride, magnesium sulfate or aluminum sulfate as the salting-out agent and devising the conditions of washing, various polymer samples shown in Table 4 having various contents of residual metal were obtained. Then they were formed into 50μ films by repeating the procedure of Example 1. These films were evaluated for water-whitening resistance.

As is apparent from the results shown in Table 4 clarity of film is lost when residual metal content exceeds 500 ppm particularly in boiling water or under other condition where the water has a high energy.

TABLE 4

| Experiment No. | Kind of salting-out agent | Content of residual metal (ppm) | Water-whitening resistance |
|---|---|---|---|
| 18 (Comparative Example) | Calcium chloride | 800 | x |
| 19 | Calcium chloride | 500 | |
| 20 | Calcium chloride | 300 | |
| 21 | Calcium chloride | 100 | " |
| 22 (Comparative Example) | Magnesium sulfate | 800 | x |
| 23 | Magnesium sulfate | 50 | |
| 24 | Aluminum sulfate | " | " |

EXAMPLE 5

Polymerization was carried out by repeating just the same procedure as in Experiment No. 1 of Example 1, except that the conditions were varied as shown in Table 5.

TABLE 5

| Experiment No. | Conditions employed |
|---|---|
| 25 | In all the layers (A) to (D), only BuA was replaced with 2EHA. |
| 26 | In all the layers (A) to (D), MMA was replaced with a monomer mixture of MMA/St (80/20, ratio by weight). |
| 27 | Only layer (D) was formed into a double layer structure consisting of layer (D-I) and layer (D-II) of which compositions were as follows: layer (D-I): MMA/BuA/AMA = 2/3/0.05 |

TABLE 5-continued

| Experiment No. | Conditions employed |
|---|---|
| | layer (D-II): MMA/BuA/AMA = 3/2/0.05 |

The polymer thus obtained all exhibited good solvent resistance and water-whitening resistance.

EXAMPLE 6

(1) Preparation of multi-layer structure polymer composition

In a polymerization vessel equipped with a cooler, 250 parts of deionized water, 2 parts of sodium salt of sulfo-succinic ester and 0.05 part of SFS were charged and stirred under a stream of nitrogen. Then, a mixture consisting of 1.6 parts of MMA, 8 parts of BuA, 0.4 part of BD, 0.1 part of AMA and 0.04 part of CHP was charged. After heating the resulting mixture to 70° C., it was reacted for 60 minutes to complete the polymerization of innermost layer polymer (A). Degree of swelling of this layer (A) was 8.5 and its gel content was 92%. Subsequently, a monomer mixture consisting of 1.5 parts of MMA, 22.5 parts of BuA, 1 part of BD and 0.25 part of AMA was mixed with 0.05%, based on the monomer mixture, of CHP and added over a time period of 60 minutes, after which the resulting mixture was retained under the condition for 60 minutes to prepare a double layer crosslinked elastomer composed of double layers of polymer (A) and polymer (B). The double layer crosslinked elastomer thus obtained showed a degree of swelling of 10.0 in MEK and had a gel content of 90%.

Subsequently, a mixture consisting of 5 parts of MMA, 5 parts of BuA and 0.1 part of AMA, corresponding to intermediate layer (D), was added over a time period of 10 minutes and polymerized to prepare an intermediate layer (D-I), and finally a mixture consisting of 52.25 parts of MMA and 2.75 parts of BuA was similarly polymerized to prepare the outermost layer polymer (C). Thus, a multi-layer structure polymer composition [I-1] was obtained. The amounts of CHP used in the polymerizations of the intermediate layer and the outermost layer were both 0.1% based on the monomer used in respective layers.

In the same manner as above, multi-layer structure polymer compositions [I-2], [I-3] and [I-4] and comparative polymers (1) and (2) were also prepared by polymerization.

In all the polymers the final particle size was in the range of 1,000–1,500 Å.

These polymer emulsions were salted out with 5 parts, per 100 parts of polymer, of calcium chloride, after which they were washed, dehydrated and dried to obtain dry powders. The amount of residual calcium in polymer was 500 ppm or less in all cases. As shown in Table 6, gel content of the multi-layer structure polymer composition was 60% or more in all the cases, with exception of compratative polymers (1) and (2).

In Table 6, comparative polymer (2) is a 3-stage polymer synthesized according to the description of Japanese Patent Application Kokai (Laid-Open) No. 33,991/77.

(2) Preparation of resin composition

Fifty parts of multi-layer structure polymer composition [I-1] was blended with 50 parts of MMA/MA copolymer (MMA/MA=99/1 by weight, $\eta_{sp}/C=0.60$ as measured at a solution concentration of 0.10 g/dl) by means of Henschel mixer. The mixture was formed at a resin temperature of 250° C. by means of an extruder equipped with a vent (L/D of screw=24).

The pellet thus obtained was dried at 80° C. for 24 hours and then formed into sheet having a thickness of 0.5 mm by the use of a T die. The results are mentioned in Table 7 as Experiment No. 28. This blend polymer had a very good sheet-formability, excellent transparency, gloss and stress-whitening resistance, a high impact strength and an excellent weather resistance.

In the same manner as above, the resin compositions of Experiment Nos. 29, 30 and 31 were prepared by blending 50 parts each of multi-layer structure polymer compositions [I-2], [I-3] and [I-4]. All the compositions thus obtained were weather resistant, impact resistant and excellent in sheet-formability, transparency and stress-whitening resistance.

When comparative polymer (1) polymerized without using graft linking agent at all was blended, transparency dropped greatly and the stress-whitening tendency was high (Experiment No. 32).

When comparative polymer (2) not having innermost layer polymer (A) was blended, drop in transparency and increase in stress-whitening tendency was similarly observed (Experiment No. 33).

On the other hand, when MBS resin was blended as a typical example of diene rubber, transparency and stress-whitening resistance dropped markedly and weather resistance also decreased markedly (Experiment No. 34).

TABLE 6

| | | Composition of multi-layer structure polymer | | | |
|---|---|---|---|---|---|
| | | Innermost layer polymer (A) | Closslinked elastic polymer (B) | Intermediate layer (D) | |
| | | | | (D-I) | (D-II) |
| Multi-layer structure polymers [I] | [I-1] = | MMA/BuA/BD/AMA 1.6/8/0.4/0.1 | = MMA/BuA/BD/AMA 1.5/22.5/1.0/0.25 | = MMA/BuA/AMA 5/5/0.1 | — |
| | [I-2] = | MMA/2EHA/BD/AMA 1.6/8/0.4/0.1 | = MMA/2EHA/BD/AMA 1.5/22.5/1.0/0.25 | = MMA/2EHA/AMA 5/5/0.1 | — |
| | [I-3] = | MMA/St/BuA/BD/AMA 1.28/0.32/8/0.4/0.1 | = MMA/St/BuA/BD/AMA 1.2/0.3/22.5/1.0/0.25 | = MMA/St/BuA/AMA 4/1/5/0.1 | — |
| | [I-4] = | MMA/BuA/BD/AMA 1.6/8/0.4/0.1 | = MMA/BuA/BD/AMA 1.5/22.5/1.0/0.25 | = MMA/BuA/AMA 2/3/0.05 | = MMA/BuA/AMA 3/2/0.05 |
| Comparative polymers | (1) = | MMA/BuA/BD 1.6/8/0.4 | = MMA/BuA/BD 1.5/22.5/1.0 | = MMA/BuA 5/5 | — |
| | (2) | — | = MMA/BuA/BD/AMA 9/21/1.2/0.25 | = MMA/BuA 10/10 | — |

| | | Composition of multi-layer structure polymer | |
|---|---|---|---|
| | | Outermost layer polymer (C) | Gel content (%) |
| Multi-layer structure polymers [I] | [I-1] = | MMA/BuA 52.25/2.75 | 67 |
| | [I-2] = | MMA/2EHA 52.25/2.75 | 66 |
| | [I-3] = | MMA/St/BuA 41.8/10.45/2.75 | 63 |
| | [I-4] = | MMA/BuA 52.25/2.75 | 68 |
| Comparative polymers | (1) = | MMA/BuA 52.25/2.75 | 40 |
| | (2) = | MMA/BuA 45/5 | 48 |

TABLE 7

| | Composition of blend polymer | | | | Results of evaluation | | | |
|---|---|---|---|---|---|---|---|---|
| | Multi-layer structure polymer composition [I] | | Thermoplastic resin [II] | | | | | 2 mm plate Dynstat impact |
| Experiment No. | Kind | Amount (part) | MMA/MA | Amount (part) | Sheet-formability | Sheet plate transparency | Sheet whitening on bending | strength (kg · cm/cm²) |
| (This invention) 28 | [I-1] | 50 | 99/1 | 50 | | | | 31 |
| (This invention) 29 | [I-2] | " | " | " | " | " | " | 30 |
| (This invention) 30 | [I-3] | " | " | " | " | " | " | 28 |
| (This invention) 31 | [I-4] | " | " | " | " | " | " | 32 |
| (Comparative Example) 32 | (1) | 50 | 99/1 | 50 | Δ | x | x | 10 |

TABLE 7-continued

| Experiment No. | Composition of blend polymer | | | | Results of evaluation | | | |
|---|---|---|---|---|---|---|---|---|
| | Multi-layer structure polymer composition [I] | | Thermoplastic resin [II] | | Sheet-formability | Sheet plate transparency | Sheet whitening on bending | 2 mm plate Dynstat impact strength (kg · cm/cm²) |
| | Kind | Amount (part) | MMA/MA | Amount (part) | | | | |
| (Comparative Example) 33 | (2) | " | " | " | | Δ | " | 22 |
| (Comparative Example) 34 | MBS resin* | 20 | " | 80 | " | x | " | 35 |

*MBS resin: A product prepared by successively graft-polymerizing 12 parts of MMA, 24 parts of St and 4 parts of MMA onto 60 parts of SBR, having the following composition: Bd/St = 75/25 (by weight).

EXAMPLE 7

Multi-layer structure polymer compositions [I-1] and [I-3] synthesized in Example 6 were blended with the various thermoplastic resins [II] shown in Table 8.

the blends with the above-mentioned polymers, they were still small in the extent of stress-whitening which is considered a sort of reinforcing effect by acrylic rubber. Improvement in weather resistance was also possible in these compositions.

TABLE 8

| Experiment No. | Multi-layer structure polymer composition [I] | | Kind and amount (parts) of thermoplastic resin [II] | | | | | | Sheet-formability | Sheet plate transparency | 2 mm plate Dynstat impact strength (kg · cm/cm²) |
|---|---|---|---|---|---|---|---|---|---|---|---|
| | Kind | Amount (parts) | PMMA | MMA/MA type | PVC | PSt | AN/St type | PE | | | |
| 35 | [I-1] | 60 | 40 | — | — | — | — | — | | | 32 |
| 36 | " | " | — | 40 | — | — | — | — | " | " | 30 |
| 37 | " | " | — | — | 40 | — | — | — | " | " | 46 |
| 38 | " | " | — | — | — | 40 | — | — | " | x | 25 |
| 39 | " | " | — | — | — | — | 40 | — | " | " | 29 |
| 40 | [I-3] | 50 | 10 | 40 | — | — | — | — | " | | 34 |
| 41 | " | 40 | — | — | 60 | — | — | — | " | | 51 |
| 42 | " | 20 | — | — | — | — | — | 80 | | x | 13 |

(Note)
In Table 7, MMA/MA type means a copolymer having a composition of MMA/MA = 87/13 (by wt.) and AN/St type means a copolymer having a composition of AN/St = 25/75 (by wt.).

When the thermoplastic resin[II] was a methyl methacrylate type polymer, the compositions obtained therefrom were all good in transparency (Experiment Nos. 35, 36 and 40).

When the multi-layer structure polymer compositions were blended with PVC, impact resistant compositions having a relatively high transparency and small in the extent of whitening on bending were obtained, though these compositions were inferior in transparency to the compositions obtained by blending methyl methacrylate type polymer. These compositions were much superior in weather resistance to usual blend compositions of MBS resin containing diene rubber or the like, and they had high transparency, weather resistance and impact resistance simultaneously (Experiment Nos. 37 and 41).

Though blended compositions with PSt or acrylonitrile-styrene copolymer could not acquire a transparency of system, they were generally small in the extent of stress-whitening and excellent in weather resistance and impact resistance, so that they were superior to usual high impact polystyrene in physical properties (Experiment Nos. 38 and 39).

Though blended compositions with olefinic polymers such as PE could not exhibit so marked an effect as in

EXAMPLE 8

Multi-layer structure polymer compositions [I-1] and [I-3] synthesized in Example 6 were blended with the thermoplastic resins [II] shown in Table 9.

In the blends with PC, a marked increase in impact strength was observed, the extent of stress-whitening was small and weather resistance was improved, though the compositions were opaque.

Such compositions markedly improved in impact resistance have a very high commercial value because their cost is lower than that of PC itself. When other type of acrylic rubber source was used, the extent of stress-whitening markedly increased similarly to the cases of other polymers mentioned above.

The same effect as above was observed in cases of polyamide and thermoplastic polyesters, too.

When blended with N6, the extent of stress-whitening was very small, though impact strength of the resin composition was markedly improved by it. Further, drawdown at the time of processing was markedly improved.

In the blend with PET, impact strength increased and drawdown property improved, similarly.

TABLE 9

| Experiment No. | Multi-layer structure polymer composition [I] Kind | Amount (parts) | Kind and amount of thermoplastic resin [II] (part) PC | PET | N6 | PST | Sheet formability | Izod impact strength (kg · cm/cm²) | Draw-down property |
| --- | --- | --- | --- | --- | --- | --- | --- | --- | --- |
| (This invention) 43 | [I-1] | 20 | 80 | — | — | — | " | 78 | " |
| (This invention) 44 | " | " | 60 | — | — | 20 | " | 63 | " |
| (This invention) 45 | [I-3] | " | 80 | — | — | — | " | 81 | " |
| (This invention) 46 | " | " | — | 80 | — | — | " | 23 | " |
| (This invention) 47 | " | " | — | — | 80 | — | " | 32 | " |
| (Comparative Example) 48 | — | — | 100 | — | — | — | | 20 | |
| (Comparative Example) 49 | — | — | — | 100 | — | — | Δ | 4 | x |
| (Comparative Example) 50 | — | — | — | — | 100 | — | " | 8 | " |

EXAMPLE 9

Ninty parts of the multi-layer structure polymer composition [I-1] synthesized in Example 6 was blended with 10 parts of PVDF (trade name Kynar 500, manufactured by PENNWALT Co.) by means of Henschel mixer, and the blended mixture was pelletized by means of screw type extruder. The pellet thus obtained was formed into a film having a thickness of 80μ by the inflation method.

Tensile strength and elongation and haze of the film thus obtained were measured. The results obtained are shown in Table 10.

The film thus obtained was laminated on a zinc-plated cold-rolled steel plate having a thickness of 0.5 mm. On this laminated sample, a Du Pont impact test was carried out. The results are shown in Table 10.

Further, the above-mentioned film was subjected to an accelerated exposure test (3,000 hours) by means of Sunshine weather-o-meter. The percent maintenance of tensile elongation after the test (a measure of weather resistance) is also shown in Table 10.

The same tests as above were carried out with the same amounts of compounded ingredients and at the same film thickness as above, except that the multi-layer structure polymer composition [I-1] was replaced with the multi-layer structure polymer compositions [I-2]-[I-4], comparative polymers (1)-(2) and PMMA. The results of the evaluations are similarly shown in Table 10.

Further, the same tests as above were carried out on the single sample of multi-layer structure polymer composition [I-1] at the same film thickness as above. The results of the evaluations are also shown in Table 10.

The products of Experiment Nos. 51-54 which are in th scope of this invention are all excellent in film properties, appearance, weather resistance, etc.

When comparative polymer (1) which has been polymerized without using graft linking agent at all was blended, the haze of the film was very great and the film readily whitened and formed cracks upon impact (Experiment No. 55).

When comparative polymer (2) having no innermost layer polymer (A) was blended, satisfactory physical properties could not be obtained in that the values of tensile strength and elongation were small, the haze was great, whitening occurred upon impact and the weather resistance was insufficient (Experiment No. 56).

When PMMA was used for blending, the tensile elongation was less than 10% and the film was broken upon impact, so that it was unsuitable for use as film-forming elementary material (Experiment No. 57).

If Experiment No. 51 and Experiment No. 58 are compared, it is understandable that the resin composition consisting of multi-layer structure polymer composition of this invention and PVDF is superior in point of tensile strength and elongation as well as in weather resistance, and the effect of blending (PVDF) is remarkable.

TABLE 10

| Experiment No. | Composition of blend polymer (parts) | | Tensile strength (kg/cm²) | Tensile elongation (%) | Naze (%) | Du Pont impact test | Maintenance of tensile elongation (%) |
| --- | --- | --- | --- | --- | --- | --- | --- |
| (This invention) 51 | Multi-layer structure polymer composition [I-1] | /PVDF = 90/10 | 340 | 178 | 4.7 | No crack; no whitening | 94 |
| (This invention) 52 | Multi-layer structure polymer composition [I-2] | / PVDF = 90/10 | 338 | 174 | 4.9 | No crack; no whitening | 93 |
| (This invention) 53 | Multi-layer structure polymer composition [I-3] | / PVDF = 90/10 | 334 | 171 | 4.9 | No crack; no whitening | 92 |
| (This invention) 54 | Multi-layer structure polymer composition [I-4] | / PVDF = 90/10 | 342 | 167 | 5.1 | No crack; no whitening | 94 |
| (Comparative Example) 55 | Comparative polymer (1) | / PVDF = 90/10 | 235 | 45 | 80 | Cracking occurs; whitening in the struck part | — |
| (Comparative Example) 56 | Comparative polymer (2) | / PVDF = 90/10 | 280 | 110 | 13.5 | Partial whitening | 75 |
| (Comparative Example) 57 | PMMA/PVDF = 90/10 | | 500 | 7 | 2.8 | Breakage in the struck part | — |
| (This invention) 58 | Multi-layer structure | | 270 | 95 | 5.0 | No crack; | 85 |

TABLE 10-continued

| Experiment No. | Composition of blend polymer (parts) | Tensile strength (kg/cm$^2$) | Tensile elongation (%) | Naze (%) | Du Pont impact test | Maintenance of tensile elongation (%) |
|---|---|---|---|---|---|---|
| | polymer composition [I-1] = 100 | | | | no whitening | |

EXAMPLE 10

The multi-layer structure polymer composition [I-1] synthesized in Example 6 was blended with PVDF (trade name Kynar 500, manufactured by PENNWALT Co.) at the compounding ratios shown in Table 11. The compounded mixtures were formed into films having a thickness of 75μ by the inflation method. The films thus obtained were evaluated in the same manner as in Example 9. The results are shown in Table 11.

Further, these films were subjected to Du Pont impact test in the same manner as in Example 9. In any of the films, breakage of film and whitening of struck surface were not observed.

TABLE 11

| Experiment No. | Multi-layer structure polymer composition [I-1] | PVDF | Tensile strength (kg/cm$^2$) | Tensile elongation (%) | Haze (%) | Maintenance of tensile elongation (%) |
|---|---|---|---|---|---|---|
| (This invention) 59 | 95 | 5 | 315 | 162 | 4.7 | 93 |
| (This invention) 60 | 90 | 10 | 340 | 178 | 4.9 | 94 |
| (This invention) 61 | 80 | 20 | 347 | 185 | 4.8 | 94 |
| (This invention) 62 | 60 | 40 | 355 | 201 | 5.0 | 95 |

What is claimed is:

1. A multi-layer structure polymer composition having the following layers as fundamental structural units;
   (a) an innermost layer polymer (A) comprising 50–100 parts by weight of an alkyl acrylate having a $C_1$–$C_8$ alkyl group ($A_1$), 0–50 parts by weight of an alkyl methacrylate having a $C_1$–$C_4$ alkyl group ($A_2$), provided that the total of ($A_1$) and ($A_2$) is 80–100 parts by weight, 0–20 parts by weight of a monomer having a copolymerizable double bond ($A_3$), 0–10 parts by weight of a polyfunctional monomer ($A_4$), provided that the total of ($A_1$), ($A_2$), ($A_3$) and ($A_4$) is 100 parts by weight, and 0.1–5 parts by weight, per 100 parts by weight of the total of ($A_1$) to ($A_4$), of a graft linking agent ($A_5$) and having a glass transition temperature of lower than 10° C., and a degree of swelling of from 2–10;
   (b) a crosslinked elastic polymer (B) comprising 80–100 parts by weight of an alkyl acrylate having a $C_1$–$C_8$ alkyl group ($B_1$), 0–20 parts by weight of an alkyl methacrylate having a $C_1$–$C_4$ alkyl group ($B_2$), 0–20 parts by weight of a monomer having a copolymerizable double bond ($B_3$), 0–10 parts by weight of a polyfunctional monomer ($B_4$), provided that the total of ($B_1$), ($B_2$) and ($B_3$) and ($B_4$) is 100 parts by weight, and 0.1–5 parts by weight, per 100 parts by weight of the total of ($B_1$) to ($B_4$), of a graft linking agent ($B_5$) and having a glass transition temperature of 0° C. or lower and a degree of swelling of from 3–15, with the proviso that the degree of swelling of layer B is higher than that of said innermost layer polymer (A);
   (c) an outermost layer polymer (C) comprising 51–100 parts by weight of an alkyl methacrylate having a $C_1$–$C_4$ alkyl group ($C_2$), 0–29 parts by weight of an alkyl acrylate having a $C_1$–$C_8$ alkyl group ($C_1$) and 0–20 parts by weight of a monomer having a copolymerizable double bond ($C_3$), provided that the total of ($C_1$), ($C_2$) and ($C_3$) is 100 parts by weight, and having a glass transition temperature of 60° C. or higher; and
   (d) at least one intermediate layer (D) between said polymer (B) layer and said polymer (C) layer comprising 10–90 parts by weight of an alkyl acrylate having a $C_1$–$C_8$ alkyl group ($D_1$), 90–10 parts by weight of an alkyl methacrylate having a $C_1$–$C_4$ alkyl group ($D_2$), 0–20 parts by weight of a monomer having a copolymerizable double bond ($D_3$), 0–10 parts by weight of a polyfunctional monomer ($D_4$), provided that the total of ($D_1$), ($D_2$), ($D_3$) and ($D_4$) is 100 parts by weight, and 0.15 parts by weight, based on a total of ($D_1$) to ($D_4$), of a graft linking agent ($D_5$), wherein the amount of alkyl acrylate in said intermediate layer (D) linearly decreases from the crosslinked elastic polymer (B) to the outermost layer polymer (C), and wherein the gel content of said multi-layer structural polymer composition is at least 50%.

2. The polymer composition according to claim 1, wherein the content of said polymer (A) is in the range of 5–35% by weight and is lower than the content of said polymer (B), the content of said polymer (B) is in the range of 10–45% by weight, the content of said polymer (C) is in the range of 10–80% by weight, and the content of each intermediate layer (D) is in the range of 5–35% by weight.

3. A multi-layer structure polymer composition having the following layers as fundamental structure units:
   (a) an innermost layer polymer (A) comprising 50–90 parts by weight of an alkyl acrylate having a $C_1$–$C_8$ alkyl group ($A_1$), 1–50 parts by weight of an alkyl methacrylate having a $C_1$–$C_4$ alkyl group ($A_2$) provided that the total of ($A_1$) and ($A_2$) is 80–100 parts by weight, 0–19 parts by weight of a monomer having a copolymerizable double bond ($A_3$), 1–10 parts by weight of a polyfunctional monomer ($A_4$), provided that the total of ($A_1$), ($A_2$), ($A_3$) and ($A_4$) is 100 parts by weight, and 0.1–5 parts by weight, per 100 parts by weight of the total of ($A_1$) to ($A_4$), of a graph linking agent ($A_5$) and having a glass transition temperature of lower than 10° C., a gel content of 80% by weight or higher, and a degree of swelling of from 2-10;

(b) a crosslinked elastic polymer (B) comprising 90-100 parts by weight of an alkyl acrylate having a $C_1$-$C_8$ alkyl group ($B_1$), 0-10 parts by weight of an alkyl methacrylate having a $C_1$-$C_4$ alkyl group ($B_2$), 0-20 parts by weight of a monomer having a copolymerizable double bond ($B_3$), 0-10 parts by weight of a polyfunctional monomer ($B_4$), provided that the total of ($B_1$), ($B_2$), ($B_3$) and ($B_4$) is 100 parts by weight, and 0.1-5 parts by weight, per 100 parts by weight of the total of ($B_1$) to ($B_4$), of the graft linking agent ($B_5$) and having a glass transition temperature of 0° C. or lower and a degree of swelling of from 3-15, with the proviso that the degree of swelling of layer (B) is a higher than that of said innermost layer polymer (A);

(c) an outermost layer polymer (C) comprising 75-100 parts by weight of an alkyl methacrylate having a $C_1$-$C_4$ alkyl group ($C_2$), 0-25 parts by weight of an alkyl acrylate having a $C_1$-$C_8$ alkyl group ($C_1$) and 0-20 parts by weight of a monomer having a copolymerizable double bond ($C_3$), provided that the total of ($C_1$), ($C_2$) and ($C_3$) is 100 parts by weight, and having a glass transition temperature of 60° C. or higher; and (d) at least one intermediate layer (D) between said polymer (B) layer and said polymer (C) layer comprising 30-70 parts by weight of an alkyl acrylate having a $C_1$-$C_8$ alkyl group ($D_1$), 70-30 parts by weight of an alkyl methacrylate having a $C_1$-$C_4$ alkyl group ($D_2$), 0-20 parts by weight of a monomer having a copolymerizable double bond ($D_3$), 0-10 parts by weight of a polyfunctional monomer ($D_4$), provided that the total of ($D_1$), ($D_2$), ($D_3$) and ($D_4$) is 100 parts by weight, and 0.1-5 parts by weight, based on the total of ($D_1$) to ($D_4$) of a graft linking agent ($D_5$), wherein the amount of alkyl acrylate in said intermediate layer (D) linearly decreases from the crosslinked elastic polymer (B) to the outermost layer polymer (C), and wherein the gel content of said multi-layer structural polymer composition is at least 50%.

4. The polymer composition according to claim 3, wherein the content of said polymer (A) is in the range of 5-15% by weight and is lower than the content of said polymer (B), the content of said polymer (B) is in the range of 10-45% by weight, the content of said polymer (C) is in the range of 40-60% by weight, and the content of said intermediate layer (D) is 5-35% by weight.

5. The polymer composition according to claim 1 which is produced by a successive multi-stage polymerization process by emulsion polymerization whereby the particle size of the emulsion in the final polymer composition is in the range of 800 Angstroms to 2000 Angstroms.

6. The polymer composition according to claim 1 which is produced by an emulsion-suspension polymerization process whereby an emulsion polymerization is initially carried out and thereafter a suspension polymerization is used for the polymerization of polymer (C).

7. The polymer composition according to claim 1, wherein said alkyl acrylate is methyl acrylate, ethyl acrylate, propyl acrylate, butyl acrylate, 2-ethylhexyl acrylate or n-octyl acrylate; said alkyl methacrylate is methyl methacrylate, ethyl methacrylate, propyl methacrylate or butyl methacrylate; said monomer having copolymerizable double bond is lower alkyl (meth)acrylate, lower alkoxy acrylate, cyanoethyl acrylate, acrylamide, acrylic acid or methacrylic acid; said polyfunctional monomer is ethylene glycol dimethacrylate, 1,3-butylene glycol dimethacrylate, 1,4-butylene glycol dimethacrylate, propylene glycol dimethacrylate, divinylbenzene, trivinylbenzene or alkylene glycol diacrylate; and said graft linking agent is allyl, methallyl or crotyl ester of $\alpha,\beta$-unsaturated carboxylic or dicarboxylic acid or triallyl cyanurate or triallyl isocyannurate.

8. The polymer composition according to claim 1, wherein the content of residual metal in the multi-layer structure polymer composition is 500 ppm or less.

9. A film-formed or sheet-formed composition having a thickness of 1 mm or less which is obtained by molding the resin composition according to claim 1.

10. A resin composition comprising a mixture consisting of 99-1 parts by weight of a multi-layer structure polymer composition according to claim 1 and 1-99 parts by weight of a thermoplastic resin which is at least one polymer selected from the following group (a) or group (b) or a mixture of at least one polymer selected from group (a) and at least one polymer selected from group (b):

(a) homopolymers of vinyl monomers having the formula $CH_2=CHX$, homopolymers of vinylidene monomers having the formula $CH_2=CXY$ and copolymers constituted of two or more members of these monomers, provided that X and Y in the above-mentioned formulas represent H, Cl, F, Br, $CH_3$, COOH, $COOCH_3$, CN, $OCOCH_3$, $C_6H_5$, alkoxy, $OCCH_3$ or $SO_3H$;

(b) polycarbonates, thermoplastic polyesters and polyamides.

11. The resin composition according to claim 10, wherein said thermoplastic resin selected from group (a) is a methyl methacrylate polymer.

12. The resin composition according to claim 10, wherein said thermoplastic resin selected from group (a) is polyvinyl chloride.

13. The resin composition according to claim 10, wherein said thermoplastic resin selected from group (a) is polyvinylidene fluoride.

14. The polymer composition according to claim 1, wherein said grafting agent ($A_5$) is present in the amount of 0.5-2.0 parts by weight per 100 parts by weight of ($A_1$)-($A_4$).

15. The polymer composition according to claim 1, wherein said innermost layer polymer (A) is 5 to 35% by weight of the total weight.

16. The polymer composition according to claim 15, wherein said innermost layer polymer (A) is 5-15% by weight of the total weight, and is present in a lesser amount than said elastic polymer (B).

17. The polymer composition according to claim 1, wherein said elastic polymer (B) is present in the amount of 10-45 weight percent based on the total weight.

18. The polymer composition according to claim 1, wherein the degree of swelling of combined double layer (A) and (B) is 3-13.

19. The polymer composition according to claim 1, wherein the gel content of each of the polymer layers (A) and (B) is at least 60%.

20. The polymer composition according to claim 19, wherein said gel content of each layer is at least 85%.

* * * * *